J. A. KIMBALL.
NUT LOCK.
APPLICATION FILED JUNE 18, 1921.
1,405,225.
Patented Jan. 31, 1922.
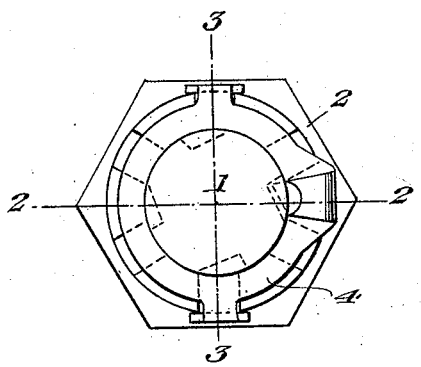
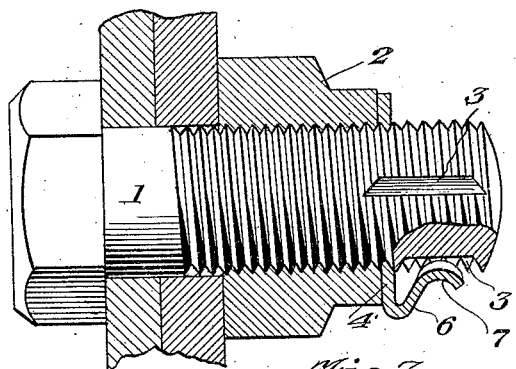
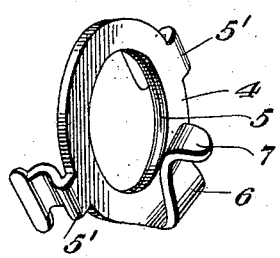
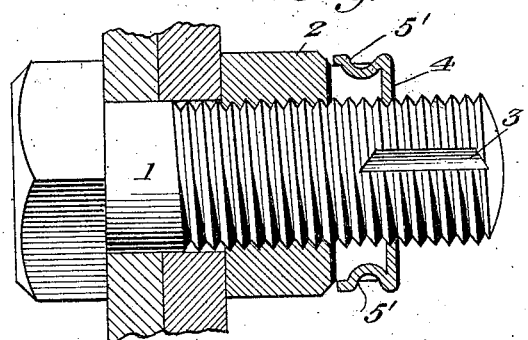
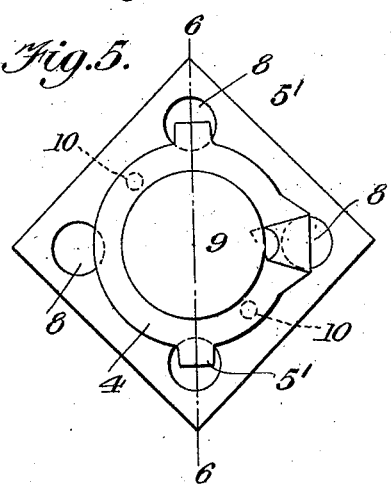
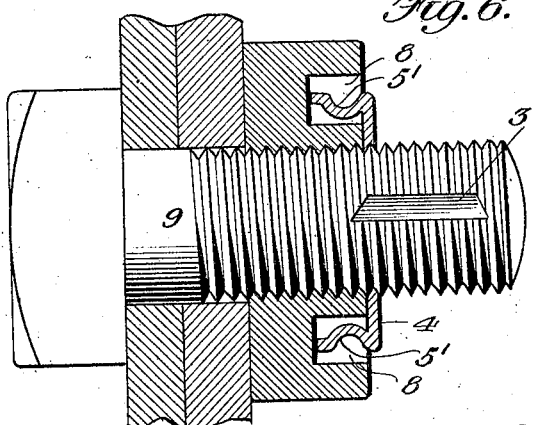
John A. Kimball
INVENTOR
BY Victor J. Evans
ATTORNEY
WITNESS:

UNITED STATES PATENT OFFICE.

JOHN A. KIMBALL, OF TAYLORVILLE, ILLINOIS.

NUT LOCK.

1,405,225.	Specification of Letters Patent.	Patented Jan. 31, 1922.

Application filed June 18, 1921. Serial No. 478,647.

*To all whom it may concern:*

Be it known that I, JOHN A. KIMBALL, a citizen of the United States, residing at Taylorville, in the county of Christian and State of Illinois, have invented new and useful Improvements in Nut Locks, of which the following is a specification.

The object of my present invention is to produce a simple, cheap and effective means whereby accidental separation of a nut which is screwed on a bolt cannot take place.

Another object is to produce a means for locking a nut on a bolt which, with only slight changes, such as providing the threaded shank of the bolt with longitudinal substantially V-shaped grooves may be connected to a castellated nut which is screwed on said bolt and engaged with the grooves of the bolt for preventing the accidental movement in an unscrewing direction, of either the nut or the bolt, and which likewise can be provided on a squared nut that has means for securing the improvement thereon, a bolt similarly grooved being threaded through the nut and engaged by the improvement.

A still further object is to produce a means for locking a nut on a bolt, in which the bolt is provided with spaced longitudinal grooves, said improvement comprising a washer having a threaded bore which is screwed on the bolt into contacting engagement with the outer face of the nut and which has means for removably locking the same to the nut, said washer having one or a plurality of spring fingers which are received in the grooves in the bolt whereby the nut and bolt are locked together, said fingers, when in bolt engaging position exerting a tension between the nut and bolt, preventing any chattering of these parts, and the said fingers being also susceptible to a movement, by a suitable instrument, outward of the groove, to permit of the separation of the nut and bolt without any deteriorating effect to the locking means, the nut or the bolt.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is a front elevation showing a castellated nut screwed on a bolt and locked thereto in accordance with this invention.

Figure 2 is a sectional view on the line 2—2 of Figure 1.

Figure 3 is a sectional view on the line 3—3 of Figure 2.

Figure 4 is a perspective view of the lock.

Figure 5 is a front elevation showing the improvement applied upon a square or other shaped nut of the ordinary construction.

Figure 6 is a sectional view on the line 6—6 of Figure 5.

Referring to the drawings in detail, and Figures 1 to 3 in particular, the numeral 1 designates a bolt on which a castellated nut 2 is screwed. The bolt, in the present instance has its threaded shank provided with longitudinally arranged circumferentially spaced depressions or grooves 3. One of the longitudinal walls of each groove is straight, and its opposite wall is arranged at an outward and upward inclination from the straight wall. Thus the walls of the grooves are V-shaped in cross section.

My improved locking means is in the nature of a disk 4. The disk has a threaded bore 5 and has its periphery provided with any desired number of angle fingers 5', all of which extend in the same direction. The fingers are preferably arched inwardly at the center thereof, and being received in the castellated portions of the nut 2 exert a friction thereagainst, the said fingers being of a width approximately equalling that of the castellations in the said nut, so that the washer 4 is held against movement on the nut. The threaded bore of the disk coincides with the threaded bore of the nut, and these elements are associated when screwed on the bolt.

Between the fingers 5', the disk 4 is provided with any desired number of oppositely extending inwardly inclined members 6. The ends of the members 6 are rounded upon themselves so that the extremities of the said members are projected outwardly. These rounded portions, indicated by the numeral 7 provide the engaging elements of the dogs which the elements 6 constitute. The dogs, when the nut is screwed home upon the bolt will ratchet over the grooves 3, but when an attempt is made to turn the nut in an unscrewing direction the active rounded ends of the dogs, contacting with the straight shoulders in one of the grooves 3, will prevent such turning.

In Figures 5 and 6, the construction of the washer is identical with that previously described, but the fingers 5' thereof are received in depressions 8 in the outer flat face of the nut 9. The bolt which engages the nut 9 is grooved as is the bolt 1, and the dog engages the grooves of the bolt in a similar manner to that previously described. It is, of course, to be understood that means other than the fingers 5' may be employed for securing the disk on the nut 9, and, as a matter of fact, any interengaging means between these elements may be provided, as for instance, and as indicated by the dotted lines in Figure 5 of the drawings, pins 10 may pass through the disk and enter the nut.

Having described the invention, I claim:—

1. In a means for locking a nut on a bolt, the combination with a nut which is screwed on a bolt, and said bolt having its shank grooved longitudinally, said means comprising a disk, means between the disk and nut for removably sustaining the same on the outer face of the nut, said disk having a threaded bore which engages the threads of the bolt, and said disk being integrally formed with dogs to be received in the grooves of the bolt and to contact with one of the side walls thereof to prevent the accidental unscrewing of the nut from the bolt.

2. In a means for locking a nut on a bolt, the combination with a bolt having its shank grooved and a nut which is screwed on the bolt, of a disk having a threaded bore which engages the threads of the bolt, angularly disposed peripheral fingers on the disk engaging the nut for holding the disk on the nut, inwardly directed spring dogs also peripherally formed on the disk, said dogs having rounded active ends which are received in the grooves of the bolt and which contact with the longitudinal walls provided by said grooves for preventing the unscrewing of the nut from the bolt.

In testimony whereof I affix my signature.

JOHN A. KIMBALL.